(12) United States Patent
Matranga et al.

(10) Patent No.: US 6,424,957 B1
(45) Date of Patent: *Jul. 23, 2002

(54) METHOD AND APPARATUS FOR PARALLEL PROCESSING OF FUZZY RULES

(75) Inventors: Vincenzo Matranga, Palermo; Biagio Giacalone, Trapani; Massimo Abruzzese, Catania, all of (IT)

(73) Assignee: Consorzio per la Ricerca sulla Microelettronica nel Mezzogiorno, Catania (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,117

(22) Filed: Sep. 26, 1997

Related U.S. Application Data

(62) Division of application No. 08/434,161, filed on May 2, 1995, now Pat. No. 5,796,917.

(30) Foreign Application Priority Data

May 23, 1994 (EP) .............................................. 94830241

(51) Int. Cl.⁷ .............................................. G06F 15/18
(52) U.S. Cl. .............................................. 706/8; 706/4
(58) Field of Search ............................... 706/8, 4, 1, 3, 706/9, 10

(56) References Cited

U.S. PATENT DOCUMENTS 4,875,184 A * 10/1989 Yamakawa ...................... 706/3
5,073,863 A * 12/1991 Zhang ................ 364/715.011

(List continued on next page.)

FOREIGN PATENT DOCUMENTS

| EP | A-0 594 222 | 4/1994 | ............. G06F/7/00 |
| JP | A-03144701 | 6/1991 | ........... G05B/13/02 |
| WO | A-9316421 | 8/1993 | ........... G05B/13/02 |

OTHER PUBLICATIONS

Catania et al., A VLSI Fuzzy Inference Processor Based on a Discrete Analog approach, IEEE transactions on fuzzy systems, p. 93–106, May 1994.*

European Search Report from European Patent Application No. 94830241.9, filed May 23, 1994.

IEEE Transactions on Fuzzy Systems, vol. 2, No. 2, May 1994, New York, pp 93–106, Catania "A VLSI Fuzzy Inference Processor Based On A Discrete Analog Approach".

(List continued on next page.)

*Primary Examiner*—Sanjiv Shah
(74) *Attorney, Agent, or Firm*—Wolf, Greenfield & Sacks, P.C.; James H. Morris

(57) ABSTRACT

Method and apparatus of parallel processing of multiple inference rules organized in fuzzy sets or logical functions of multiple fuzzy sets including membership functions defined in a so-called universe of discourse. The inference rules are configured essentially as IF-THEN rules with at least one antecedent preposition and at least one consequent implication. The prepositions have at least one term of comparison between membership functions and a plurality of input data and each term is separated by logical operators. The method associates with the logical operators maximum and minimum operations among two or more elements and calculates exhaustively the overall degree of truth ($\Omega$) of a rule with a maximum or minimum of N partial truth levels. The method is accomplished by a plurality of identical, parallel inferential processors. Each inferential processor determines a preposition or a partial truth level of a preposition.

4 Claims, 4 Drawing Sheets

U.S. PATENT DOCUMENTS

| | | | | |
|---|---|---|---|---|
| 5,305,424 A | | 4/1994 | Ma | 706/52 |
| 5,495,558 A | | 2/1996 | Tashima | 706/52 |
| 5,506,936 A | | 4/1996 | Hisano | 706/4 |
| 5,537,514 A | | 7/1996 | Nishidai | 706/52 |
| 5,561,738 A | * | 10/1996 | Kinerk et al. | 706/4 |
| 5,615,303 A | * | 3/1997 | Abruzzese et al. | 706/4 |
| 5,710,867 A | * | 1/1998 | Giacalone et al. | 706/1 |

OTHER PUBLICATIONS

IEEE International Conference On Fuzzy Systems, Mar. 12, 1992, San Diego, CA, pp 949–956, Demirli, et al., "Rule Break Up With Compositional Rule Of Inference".

IEEE Expert, vol. 1, No. 3, 1986, New York, US, pp 55–62, Togai et al., "Expert System On A Chip Etc . . . ".

* cited by examiner

METHOD AND APPARATUS FOR PARALLEL PROCESSING OF FUZZY RULES

This application is a division of application Ser. No. 08/434,161, filed May 2, 1995, entitled METHOD AND APPARATUS FOR PARALLEL PROCESSING OF FUZZY RULES and now U.S. Pat. No. 5,796,917.

BACKGROUND OF THE INVENTION

1. Field of the Invention

The present invention relates to a method for calculation in parallel of multiple fuzzy logic inference rules. The present invention concerns also a circuit architecture for implementation of the parallel calculation.

Specifically the present invention relates to a method for parallel processing of multiple fuzzy logic inference rules organized in fuzzy sets or logical functions of multiple fuzzy sets including membership functions defined in a so-called discourse universe and said rules being configured essentially as IF-THEN rules with at least one antecedent preposition and at least one consequent implication and said prepositions including at least one term of comparison between the membership functions and a plurality of input data and the terms being separated by logical operators.

2. Discussion of the Related Art

Fuzzy logic has now been established as a technique capable of supplying solutions for broad classes of control problems for which conventional techniques, e.g. those based on Boolean logic, have proven unsuited, and for providing acceptable performance at acceptable cost.

Fuzzy logic supplies a method of modelling the 'inaccurate' modes of reasoning typical of the human mind and which play an essential role in the human ability to make decisions under conditions of uncertainty.

Fuzzy logic operates on a linguistic description of reality using a particular class of variables termed 'linguistic variables'. The values of said variables include words or phrases of any natural or artificial language. Basically, to each variable is assigned a corresponding semantic meaning of the words or phrases which are used in the modelling of a given problem.

In addition, to each variable can be syntactically joined a set of values dependent upon it which can take on different meanings depending on the context in which they are employed. Said values are found starting from a primary term which represents the variable, from one of its contraries, and from a series of so-called modifiers of the primary term, as described in European patent application no. 92830095.3.

Each value assigned to a linguistic variable is represented furthermore by a so-called fuzzy set, a possibilistic distribution function which links each value of the variable corresponding definition domain known as the universe of discourse.

The functions which identify a fuzzy set in the universe of discourse of a variable are called membership functions FA. For example, a value FA=0 indicates the non-membership of the point in the fuzzy set identified by the function, while a value FA=1 indicates the certainty of membership of the point in the fuzzy set. The assembly of all the fuzzy sets of a linguistic variable is called a 'term set'.

Membership functions are defined by means of a sample representation obtained by dividing the definition domain in m points and the interval [0, 1] in 1 levels.

At present, definition or storage in a fuzzy logic based electronic controller of the membership functions which identify the fuzzy sets represents one of the major constraints on development of new fuzzy logic applications and thus limits the theoretical potential of this methodology.

Indeed, if it is desired to implement the membership functions in hardware to reflect the semantics of the fuzzy concept and to obtain a correct incidence of a term in a rule, one is forced to use considerable memory space. This makes fuzzy logic advantageous only for those applications where the term set of the linguistic variable consists of a reduced number of membership functions.

The data for a membership function are normally stored in a memory word. In known devices the memory area occupied is thus negatively influenced by the number of data necessary for defining these membership functions.

In many cases it has proven sufficient to store triangular membership functions, generally not symmetrical, or trapezoid membership functions so as to reduce the amount of data necessary for their storage.

With these triangular or trapezoid membership functions, it is not at all necessary to store the values of the function at all points of the universe of discourse. It is sufficient to store only the points where the curve changes slope and the value of this slope.

Appropriate logical operations—termed 'inferential'—which allow description of the behavior of a system with the change in input parameters are performable among the membership functions. These operations are performed by fuzzy rules which have generally a syntax of the following type:

IF $X$ IS $A$, THEN $Y$ IS $B$ where 1 is the input value, A and B are membership functions FA which represent system knowledge, and Y is the output value.

The part of the rule preceding the term THEN is called the 'left' or 'antecedent' part while the following part is called 'right' or 'consequent' part of the inference rule.

The implication between the antecedent part and the consequent part of a fuzzy rule is governed by two laws:

modus ponens: in it the truth of the implication (Th), i.e. of the consequent part of the rule, depends on that of the premise (Hp), i.e. the antecedent part of the rule;

modus tollens: in it occurrence of the implication (Th) which ensures correctness of the premise (Hp).

Adopting the modus ponens as the rule, the degree of truth of the entire rule cannot be greater than that of the antecedent part.

Since the antecedent part can be made up of one or more terms T corresponding to hypotheses of the type (F is F') on the data F and on the membership functions F' its overall degree of truth which we shall indicate by the symbol W in the following description depends on the inference operations on these same terms T.

In addition the overall degree of truth W takes on a determinate value by applying to these terms T the logical operators AND, OR and NOT.

Electronic data processing tools which allow performance of this type of operation require a particular architecture expressly dedicated to the set of inference operations which constitute the fuzzy logic computational model.

With reference to triangular or trapezoid membership functions FA such as those set forth in FIG. 1, a weight of a set of data I for an antecedent part term represented in the universe of discourse U by means of a membership function I' means the greatest value of the intersection between the input data set I and the membership function I' corresponding to said term T.

In a processor operating with fuzzy logic procedures there must be room for a circuit capable of calculating the overall degree of truth W regardless of the logical operators present.

Heretofore multivalue fuzzy logic inferences were calculated in different ways.

In a project developed at OMRON by T. Yamakawa et al. the inference processing circuit can operate analogically in parallel only on four rules whose antecedent part can have at most three terms.

In addition to this initial limitation, for design simplicity other constraints were imposed:

the terms T of the antecedent part of the rules can be separated only by logical operators AND;

the membership functions I' of the term sets of the input variables I can only have an S, Z, trapezoid or triangular shape;

the inputs are deterministic, i.e. they correspond to an individual point P in the universe of discourse U.

An architecture of H. Watanabe et al. performs in parallel all the rules for the same output variable. The user is however limited in his choice of the variables with which he can work. These can be only four input variables and two output variables out of fifty-one rules, or two input variables and one output out of one hundred two rules.

A plurality of Watanabe circuits can be connected in cascade under control of a software program in such a manner as to process more than one hundred two rules. In this case moreover it is possible to introduce a feedback of the output signal on the input of one of the components.

In like manner circuits of this type can be connected to operate with a larger number of input variables.

These architectures however involve an increase in the area of silicon occupied since they require memories of greater size.

A third known solution is the Fuzzy Micro Controller of Neural Logix in which only symmetrical and linear membership functions (triangles, trapezes, etc.) are used. Since each antecedent part of a rule can contain up to a maximum of sixteen terms, there are sixteen fuzzifiers at the input of this circuit.

The Neural Logix circuit can process up to sixty-four rules. Variables to be controlled or fedback output variables can be applied as inputs.

In this processing circuit a neural network determines the smallest of the sixteen terms contained in the antecedent part of the rule. The overall degrees of truth W of all sixty-four antecedent parts are used to calculate the maximum value by means of a circuit having a single register which is continually updated on the basis of each evaluation of the weight of each antecedent part.

Lastly, a processor known in the trade as 'WARP' and manufactured by processes sequentially up to two hundred fifty-six rules whose antecedent parts are made up of four terms.

The architecture of the inferential part was designed to calculate the degree of truth of the premise by means of parallel computation on four α values. These α values are taken simultaneously from the data memory once the input variables are known.

In the case of rules whose antecedent parts contain more than four terms T separated by logical operators the processing is carried out by dividing said antecedent parts in several antecedent sub-parts each of which contains four terms in the antecedent part allowing for the partial truth level w of each antecedent sub-part obtained by means of a feedback to the inference calculation circuit.

All the circuits heretofore available to the technicians of the industry cannot be considered absolutely effective because their efficacy depends strongly on the type of application.

In particular, the architectures which give priority to parallel processing of the inference rules in such a manner as to gain processing time lose necessarily in occupied silicon area.

On the other hand reduction of the occupied memory area by a decrease in the number of computational units causes efficiency of parallel processing to depend strongly on the number of rules associated with each individual inference operation.

Actually, if all the inferences to be processed are characterized by the same number $N_{FR}$ of fuzzy rules there can be a less than optimal use of available resources each time the number of processing units $N_{PU}$ present in the architecture is not exactly a submultiple of the number $N_{FR}$ of fuzzy rules.

In this case the following relationship is not satisfied:

$$N_{FR} \bmod N_{PU} = 0$$

i.e. $N_{FR}$ is not exactly divisible by the number $N_{PU}$.

In practice it is not always possible to introduce a number of inferential units equal to the number of the rules describing the process. Typically one is forced to oversize or undersize the calculation structure.

The technical problem underlying the present invention is to identify a new parallel processing method for multiple fuzzy rules which would not depend on the number of terms making up the antecedent part of the rules or the logical operators linking them.

SUMMARY OF THE INVENTION

The present invention provides simultaneous processing of several rules which can be configured dynamically in a flexible manner on the basis of the characteristics of the different applications for which the fuzzy logic is designed.

In one aspect of the invention, parallel processing is used for various rules. The rules are divided so that no antecedent has more than a certain number of elements. New rules are created for the remaining elements of an antecedent which has more than the specified number. Each rules is processed in parallel to determine a weight. The weights of the rules are then combined to determine an overall truth level. In another aspect of the invention, all of the rules process the same number of elements in an antecedent. Neutral elements are added to rules having fewer elements. In another aspect of the present invention, processing is modular so that identical processing can be performed for various rules and antecedent elements in a tree structure.

Another aspect of the invention provides an apparatus for performing parallel processing. The apparatus may include several identical processing units arranged in a tree structure for processing the antecedents of rules. The processing units receive input data and operators, determine weights based upon the input data and combine the weights using the operators. In another aspect of the invention, the processing units include a control unit for providing the proper input data and operators to the processing unit so that each rule is properly processed.

DETAILED DESCRIPTION

With reference to FIGS. 1A–1D a membership function, indicated by I', of a linguistic or logical variable M is represented by means of a vectorial system where along the axis of the abscissa is defined a so-called universe of discourse U while along the ordinate axis is defined a so-called degree of truth or membership G.

The input data are represented by the same reference system.

In FIGS. 1A–1D are shown four membership functions I' which identify in the universe of discourse U fuzzy sets which are part of a so-called term set. The weights $\alpha_j$ of each term T of an inference rule R, i.e., the highest value of the intersection between the set of input data I and the membership function I' corresponding to said term T, are also shown.

Figure 1A:
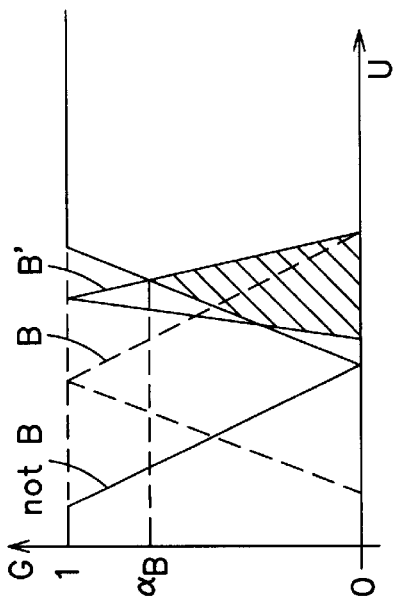
FIGS. 1A–1D show membership functions I' of a possible term set and a set of input data I.
Figure 1B:
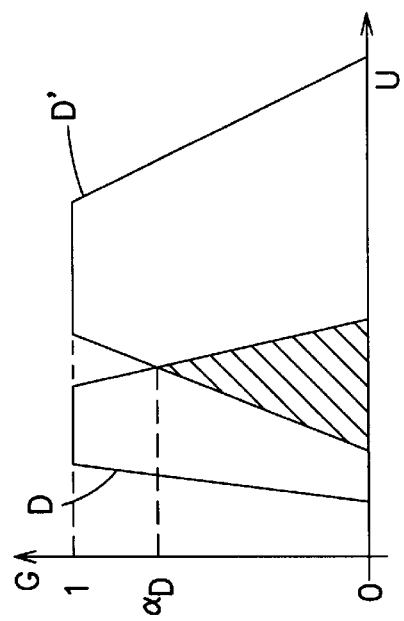
Figure 1C:
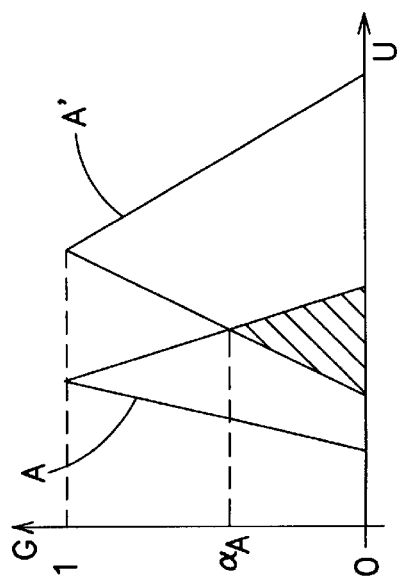
Figure 1D:
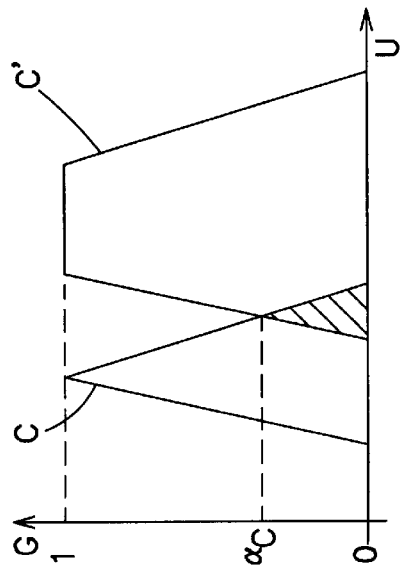
Figure 2A:
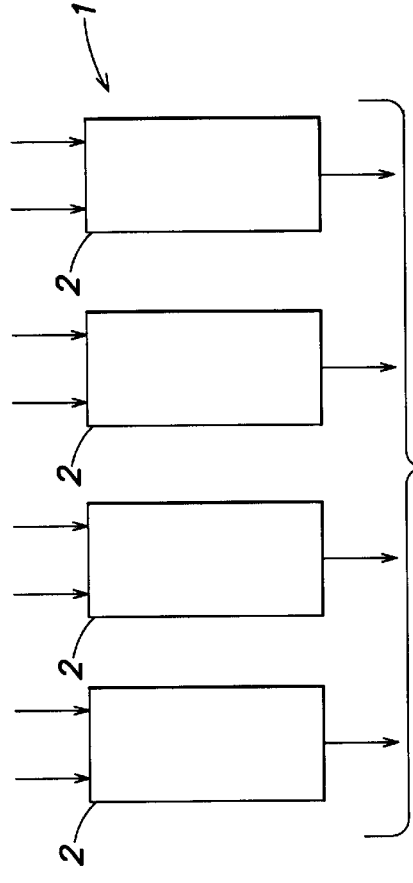
FIGS. 2A–2B show schematically possible circuit architectures designed for implementation of the method in accordance with the present invention.
Figure 2B:
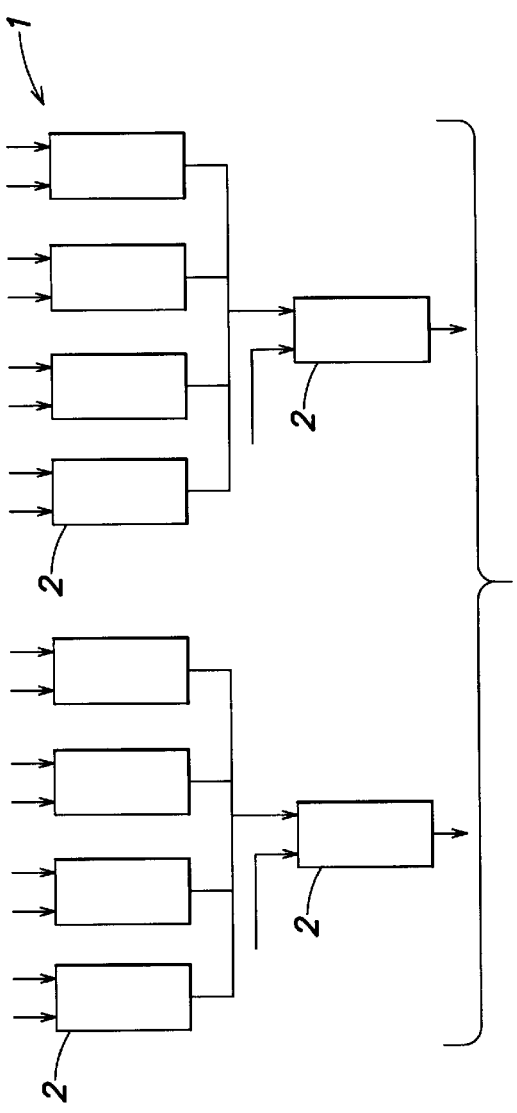

As shown in FIGS. 2A and 2B, the present invention includes a new inferential unit 1 which determines exhaustively the overall degree of truth W in an inference rule R. The inferential unit 1 is provided by means of a modular structure which can be configured in such a manner as to process multiple fuzzy rules in parallel.

By way of example let us consider a rule R1 formed as follows:

IF (A is A') AND (NOT B is B') OR NOT [(C is C') AND (D is D')] THEN

The antecedent part of this rule R1 is made up of four terms Tj placed between round parentheses and takes on a value determined by applying thereto the logical operators present AND, OR and NOT, assigning to them decreasing priority in the order NOT, AND, OR.

In the graphs of FIGS. 1A–1D are shown the weights $\alpha_A$, $\alpha_B$, $\alpha_C$ and $\alpha_D$ for the four terms Tj:

$\alpha_A$=maxx [min(A, A')]

$\alpha_B$=maxx [min(not B, B')]

$\alpha_C$=maxx [min(C, C')]

$\alpha_D$=maxx [min(D, D')]

In fuzzy logic semantics, with the operators AND and OR are associated respectively minimum and maximum operations between two or more elements while with the operator NOT is associated a complementary operation for one in the universe U.

The exemplary rule R1 is then solved in the method in accordance with the present invention in accordance with the following successive steps:

calculate the complement of one CTB corresponding to a first logical operator NOT of the term TB, calculate the minimum partial truth levels w1 and w2 corresponding to operators OR, of the weights $\alpha_i$ of the terms TA and CTB and TC and TD respectively:

$w1=\min[a_A,(1-a_B)]$ $w2=\min(a_C - a_D)$ calculate the complement to one Cw2 corresponding to another operator NOT of the partial truth level w2, evaluate the overall truth level W of the rule R1 as maximum corresponding to a logical operator AND between the values w1 and Cw2:

$\Omega = \max(w1, Cw2)$

In practice the input variables I can be reduced to a single value P in the universe of discourse U (then termed 'crisp' input). In these cases the truth level $\alpha_j$ of each term $T_j$ the value of the membership function I' corresponding to that input value P.

For the sake of simplicity we shall refer below in the description to this P type of input value.

In FIGS. 2A and 2B are shown schematically examples of possible circuit architectures designed for parallel processing of multiple fuzzy logic inference rules.

Specifically FIG. 2A shows a structure for simultaneous processing of several fuzzy rules with four terms in the antecedent part while FIG. 2B shows a tree structure for the processing of a fuzzy rule with more than four terms T in the antecedent part.

The circuit architectures of FIGS. 2A and 2B are inferential units 1 having modular structure and comprising a plurality of the same circuit elements designed for inferential processing. Said elements are indicated by number 2 and can be connected in parallel or in a tree structure.

This embodiment is based on a fuzzy system for a process with a universe of discourse U which can be represented by a seven-bit code and a degree of truth G which can be represented by a four-bit code.

Figure 3:
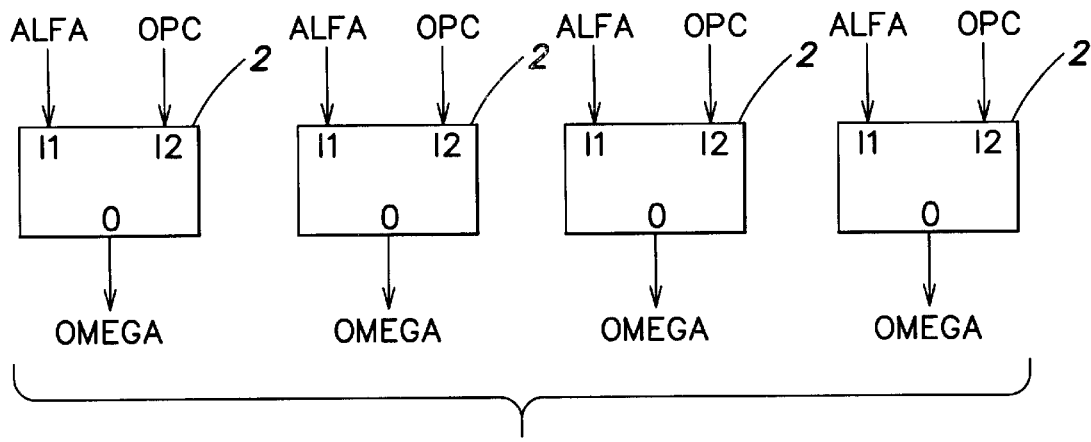
FIG. 3 shows a detail common to the architectures of FIGS. 2A–2B.

The inferential unit 1 is represented in greater detail in FIG. 3.

The inferential unit 1 in the example considered consists internally of four identical circuits 2. Advantageously in accordance with the present invention each of these circuits 2 computes the premise of a rule.

Preferably the rules R have antecedent parts made up of only four terms T separated by three operators of the AND/OR type.

Each circuit 2 has two inputs I1 and I2 and an output O and processes a fuzzy rule R.

The input I1 receives a set of data ALFA each of which is coded by means of sixteen bits and represents the values of the weights $\alpha$ and $\alpha'$ to be processed. The input I2 receives a set of logical operators OPC coded by means of three bits for the logical operations to be realized.

Specifically each circuit 2 receives in the data set ALFA four rules R to each of which correspond four fuzzy sets FS as well as a series of three logical operator codes OPC.

The coded signals OPC indicate the logical operations to be performed and specifically the logical operator AND is made to correspond to the logical value 1, i.e. the minimum fuzzy logic operation, while to the logic value 0 is made to correspond the logical operator OR, i.e. the maximum fuzzy logic operation.

All the circuits 2 supply as an output O the value OMEGA for the inference rule Ri processed.

The value OMEGA can represent the overall degrees of truth of four different rules R or, as an alternative, the partial truth levels w of a rule R with more than four terms T in the antecedent part on the basis of which the overall degree of truth Ω of the rule can be calculated.

Figure 4:
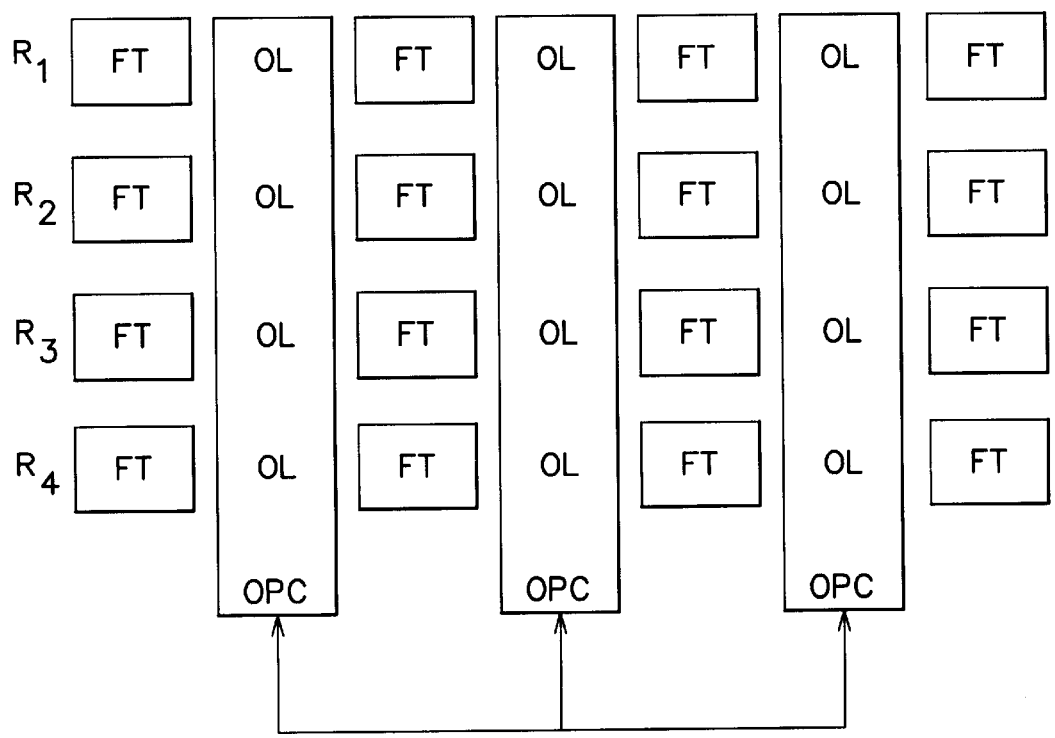
FIG. 4 shows in greater detail the structure of the detail of FIG. 3.

As shown in FIG. 4 the sixteen values contained in ALFA are distributed on four lines corresponding to the four inference rules R to be processed simultaneously together with the codes OPC of the logical operations which must be performed between the terms Tj of each rule R.

In the case of a fuzzy rule R2 whose antecedent part is made up of four terms Tj, i.e. the type:

IF (A is A') AND (B is B') AND (C is C') AND (D is D') THEN the overall degree of truth Ω can be determined directly and simultaneously for the four terms T of the rule with a structure of the type shown in FIG. 3.

In the case of a rule R3 with more than four terms T in the antecedent part, i.e. of the type:

IF (A is A') AND (B is B') AND (C is C') OR (D is D') OR (E is E') AND (F is F') OR (G is G') THEN one can apply the method in accordance with the present invention separating the starting rule in several sub-rules with four terms in the antecedent part and a consequent term and introducing depending on necessity additional logical operators in such a manner as to obtain exactly four terms in the antecedent part for each sub-rule.

Introduction of these additional logical operators must leave unchanged the starting rule R3. With them are then associated the corresponding neutral elements. If the added operator is a logical OR it is followed by the term 0 while if the added operator is a logical AND it is followed by the term 1.

After distribution in sub-rules it is possible to apply to each of them the processing method in accordance with the present invention to obtain partial truth levels w. The overall degree of truth Ω of the rule R is then obtained as the maximum or minimum of the partial weights w depending on whether the rule R was broken at an operator OR or AND respectively.

The exemplary rule R3 can be broken in two sub-rules by adding an operator OR and the corresponding neutral element 0 obtaining:

IF (A is A') AND (B is B') AND (C is C') OR (D is D') THEN

IF (E is E') AND (F is F') OR (G is G') OR 0 THEN

The overall degree of truth n will be the highest of the partial truth levels w1 and w2 since the starting rule R3 was broken at an operator OR. The rule can be implemented by means of a tree structure of the same type as shown in FIG. 2B.

These examples permit understanding of how the use of a modular structure in accordance with the present invention allows obtaining directly the N overall degrees of truth Ω of N distinct inference rules R (with N equal to four in the example considered) and each of which has N terms in the antecedent part or the N partial truth levels w for a given rule R with more than N terms in the antecedent part.

In this manner the processing method in accordance with the present invention reduces to an Nth the time required for processing of a set of fuzzy rules.

Naturally whether processing N inference rules R or a rule R with more than N terms in the antecedent part it is disadvantageous to insert a number of twin circuits equal to the number of fuzzy rules which determine the related output variable, i.e. a number of circuits equal to the process variables, in such a manner as to find the overall degree of truth Ω by making use of a single processing cycle. But it is reasonable to think of a system having a number of identical circuits which approaches most the number of rules by which the process under observation is described.

Indeed, one of the major advantages of the fuzzy rule processing method in accordance with the present invention is the repeatability of the basic inference structure. In this manner, by analyzing the process to be monitored, after determination of the number of the input variables and implications necessary for processing, the user can choose the number of inference units best suited to said structures for inferential calculation depending on whether the more stringent restraint is processing time or circuit size.

Even though the introduction of several functionally equivalent blocks involves increase in the sizes of the overall circuit the size of the circuit portion assigned to inferential computation is such as to permit several presences thereof in a processor operating with fuzzy logic procedures and especially when the phenomenon to be monitored requires reduced processing times. Indeed, the processing method in accordance with the present invention permits reducing processing time by (Nr−1) times where Nr is the number of twin structures, equal to the number of rules present, to be inserted in parallel. Thus, for example, if there were X rules to be processed in a single structure there would have to be performed X-processings while by employing X twin structures in parallel a single processing would be sufficient, thus reducing the total performance time by (X−1) times.

Figure 5:
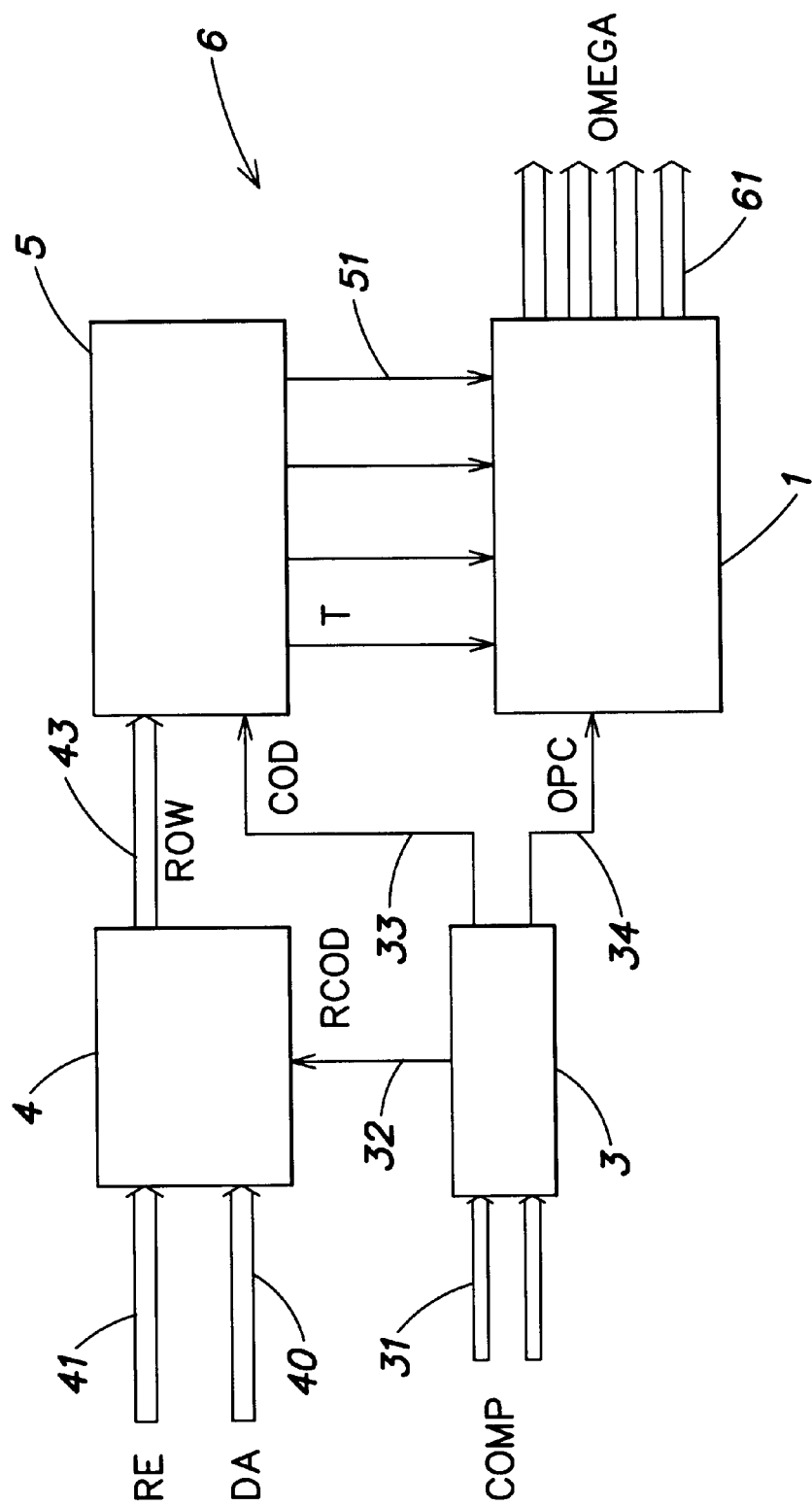
FIG. 5 shows schematically a circuit provided in accordance with the present invention for implementation of the multiple fuzzy rule parallel processing method.

FIG. 5 shows the structure of a fuzzy rule processing circuit 6 comprising an inferential unit 1 which performs the method in accordance with the present invention.

The fuzzy rule processing circuit 6 includes a first decoder block 3 which receives at input data COMP through bus 31 and has an output connected through a bus 32 to a second sorter block 4. The decoder block 3 has additional outputs connected through a bus 33 to a third selector block 5 and through a bus 34 to an inferential unit 1 respectively.

The sorter block 4 receives at input data RE through a bus 41 and data DA through a bus 42. It is also connected at output through a bus 43 to the third selector block 5.

The third selector block 5 has a plurality of outputs connected through multiple busses 51 to the inferential unit 1.

The inferential unit 1 supplies at output through multiple busses 61 the value OMEGA.

We shall now discuss the operation of the fuzzy rule processing circuit 6 of FIG. 5 for parallel calculation of the degree of truth of four terms T of the antecedent part of a fuzzy rule.

The fuzzy rule processing circuit 6 receives at input sixteen fuzzy terms and must sort them correctly inside the related rules by means of the functional blocks which it includes.

The decoder block 3 acquires all the information COMP to constitute the data and supply the values:

RCOD: for sorting fuzzy terms on the rules,

COD: for selection of the exact fuzzy set among those contained in the fuzzy term transmitted, and OPC: containing the code of the logical operators to be applied to the individual fuzzy sets.

The sorter block 4 sorts the sixteen fuzzy terms into four sets of data rows (ROWi) on the basis of the information supplied by RCOD.

Finally, the selector block 5 extracts from the related fuzzy term the fuzzy set which appears as term T of the antecedent part of the rule R which the circuit is processing based upon the information contained in the signal COD.

The correct sequence of the membership functions contained in the terms T of the antecedent part of the rule R in question and of the operators OPC which link these terms are then supplied to the inferential unit 1 for the actual calculation of the values OMEGA.

Advantageously in accordance with the present invention this value OMEGA can represent the overall degrees of truth of four different rules or, as an alternative, the partial truth levels w of a rule R with more than four terms T in the antecedent part on the basis of which one can then calculate the overall degree of truth n of the rule R.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A fuzzy processing unit for processing a plurality of rules comprising:
    a plurality of processing circuits for processing a first plurality of variables of a premise of a fuzzy logic inference rule having a second plurality of variables, each processing circuit processing at least a portion of an antecedent of a rule and each processing circuit including:
        a first input receiving input data corresponding to the first plurality of variables;
        a second input receiving operators corresponding to inferential operations between tile first plurality of variables;
        a processing section determining a truth level based upon the input data and operators; and
    a control unit that supplies the input data and the operators to the plurality of processing circuits, the control unit including:
        a circuit that adds neutral variables to a rule, if the second plurality of variables is less than the first plurality of variables, to obtain a new rule, wherein the new rule has a third plurality of variables equal to the first plurality of variables;
        a circuit that supplies new input data and new operators corresponding to tie new rule to at least one of the plurality at processing circuits; and
        a circuit that combines truth values from the plurality of processing circuits to determine an overall truth value.

2. The fuzzy processing unit of claim 1, wherein the processing section includes a circuit that determines a weight for each of the first plurality of variables, and a circuit that combines the weights based upon the operators.

3. The fuzzy processing unit of claim 1, wherein the control unit further includes:
    a selector that selects membership functions to be supplied to the plurality of processing circuits;
    a sorter that selects input data to be supplied to the plurality of processing circuits; and
    a decoder that decodes instructions to supply operators to the plurality of processing circuits, and to output control signals to the sorter and selector.

4. The fuzzy processing unit of claim 1, wherein the control unit further includes:
    a separator that separates a rule, if the second plurality of variables is greater than the first plurality of variables, into subparts, each subpart including a portion of the second plurality of variables no greater than the first plurality of variables; and
    a circuit that supplies input data and operators corresponding to each of the subparts to the plurality of processing circuits.

\* \* \* \* \*